(12) United States Patent
Lyngby et al.

(10) Patent No.: US 9,759,199 B2
(45) Date of Patent: Sep. 12, 2017

(54) LIGHTNING CURRENT TRANSFER ARRANGEMENT OF A WIND TURBINE

(75) Inventors: Claus Grøn Lyngby, Brædstrup (DK); Hans V. Erichsen, Århus V (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 767 days.

(21) Appl. No.: 13/813,922

(22) PCT Filed: May 31, 2011

(86) PCT No.: PCT/EP2011/058920
§ 371 (c)(1),
(2), (4) Date: Apr. 11, 2013

(87) PCT Pub. No.: WO2012/016726
PCT Pub. Date: Feb. 9, 2012

(65) Prior Publication Data
US 2013/0195664 A1    Aug. 1, 2013

Related U.S. Application Data

(60) Provisional application No. 61/369,807, filed on Aug. 2, 2010.

(30) Foreign Application Priority Data

Aug. 2, 2010    (DK) .............................. 2010 00692

(51) Int. Cl.
*B64C 11/06* (2006.01)
*F03D 11/00* (2006.01)
(Continued)

(52) U.S. Cl.
CPC .......... *F03D 11/0033* (2013.01); *F03D 80/30* (2016.05); *H01T 4/08* (2013.01); *Y02E 10/722* (2013.01); *Y02E 10/726* (2013.01)

(58) Field of Classification Search
CPC ..... F03D 11/0033; H01T 4/08; Y02E 10/722; Y02E 10/726
See application file for complete search history.

(56) References Cited

U.S. PATENT DOCUMENTS 7,390,169 B2 *  6/2008  Larsen ................... F03D 11/00
                                              416/146 R
2003/0170122 A1  9/2003  Wobben
(Continued)

FOREIGN PATENT DOCUMENTS

DE    4436197 A1    4/1996
DE    4445899 A1    6/1996
(Continued)

OTHER PUBLICATIONS

International Search Report dated Feb. 2, 2012 for International Application No. PCT/DK2011/050295, 3 pages.
(Continued)

*Primary Examiner* — Jason Shanske
*Assistant Examiner* — Matthew T Largi
(74) *Attorney, Agent, or Firm* — Patterson + Sheridan, LLP

(57) ABSTRACT

A lightning current transfer arrangement for a wind turbine is provided, to enable lightning current and electrostatic discharge current to be discharged from a first and a second part of the wind turbine being rotatable relative to each other. The lightning current transfer arrangement is arranged to provide electrical contact between the first and second parts, and has a current transfer unit electrically coupled to the first part, and an electrically conductive slideway electrically coupled to the second part, and rotatable relative to the current transfer unit. The current transfer unit further has a slider elastically biased towards the slideway, where the slider comprises a slide piece made of conductive plastics and contacting the slideway, and an electrode made of metal
(Continued)

and directed towards the slideway, the electrode and the slide piece being rigidly coupled.

20 Claims, 7 Drawing Sheets

(51) Int. Cl.
  *H01T 4/08*   (2006.01)
  *F03D 80/30*  (2016.01)

(56) References Cited

U.S. PATENT DOCUMENTS

2009/0038819 A1* 2/2009 Molbech ............ F03D 11/0033
                                                    174/2
2013/0181457 A1* 7/2013 Lyngby ............... F03D 11/0033
                                                    290/55

FOREIGN PATENT DOCUMENTS

| EP | 1577551 A2 | 9/2005 | |
|----|------------|--------|---|
| WO | 2005050008 A1 | 6/2005 | |
| WO | 2005114782 A2 | 12/2005 | |
| WO | WO 2005114782 A2 * | 12/2005 | ............ H01R 39/20 |
| WO | 2009130143 A2 | 10/2009 | |
| WO | 2012016568 A2 | 2/2012 | |

OTHER PUBLICATIONS

DK Search Report dated Mar. 7, 2011 for Application No. PA2010 00692, 1 page.

International Search Report dated Feb. 2, 2012 for International Application No. PCT/EP2011/058920, 3 pages.

U.S. Appl. No. 13/813,917, filed Feb. 1, 2013, national phase entry of International Application No. PCT/DK2011/050295 filed on Aug. 1, 2011.

* cited by examiner

LIGHTNING CURRENT TRANSFER ARRANGEMENT OF A WIND TURBINE

FIELD OF THE INVENTION

The present invention relates to a lightning current transfer arrangement of a wind turbine, and to a wind turbine comprising one or more lightning current transfer arrangements.

BACKGROUND OF THE INVENTION

In a known lightning conductor system for a wind turbine a gap in the lightning down-conductor between a pitchable rotor blade and the wind turbine's nacelle—two parts which are rotatable relative to each other—is bridged by a lightning current transfer arrangement having sliding contacts which contact complementary slideways, as described in WO 2005/050008 A1. The sliding contacts include a contact rod which provides the electric contact with the slideway, and a slide pad surrounding the contact rod to increase the sliding surface and lower sliding friction.

Other types of sliding contacts for wind turbines with in the form of metal or carbon brushes are known, e.g. from WO 2004/001224 A1.

U.S. Pat. No. 7,390,169 B2 describes a lightning current transfer arrangement for a wind turbine having a sliding contact and a spark gap towards a contact member. The sliding contact and the spark gap are connected in parallel.

SUMMARY OF THE INVENTION

A lightning current transfer arrangement of a wind turbine is provided in one embodiment. The wind turbine comprises a first and a second part being rotatable relative to each other. The lightning current transfer arrangement is arranged to provide electrical contact between the first and second parts. It comprises a current transfer unit electrically coupled to the first part, and an electrically conductive slideway electrically coupled to the second part, and rotatable relative to the current transfer unit. The current transfer unit further comprises a slider elastically biased towards the slideway, where the slider comprises a slide piece which is made of conductive plastics and contacts the slideway, and an electrode which is made of metal and is directed towards the slideway. The electrode and the slide piece are rigidly coupled.

According to another aspect a wind turbine is provided comprising at least one lightning current transfer arrangement. The wind turbine comprises a first and a second part being rotatable relative to each other. The at least one lightning current transfer arrangement is arranged to provide electrical contact between the first and second parts. It comprises a current transfer unit electrically coupled to the first part, and an electrically conductive slideway electrically coupled to the second part, and rotatable relative to the current transfer unit. The current transfer unit further comprises a slider elastically biased towards the slideway, where the slider comprises a slide piece which is made of conductive plastics and contacts the slideway, and an electrode which is made of metal and is directed towards the slideway. The electrode and the slide piece are rigidly coupled.

Other features are inherent in the methods and products disclosed or will become apparent to those skilled in the art from the following description and the accompanying drawings.

BRIEF DESCRIPTION OF THE DRAWINGS

Embodiments of the present invention are explained by way of example with reference to the accompanying drawings. It is to be noted that the appended drawings illustrate only examples of embodiments of this invention and are therefore not to be considered limiting of its scope, for the invention may admit to other equally effective embodiments.

Figure 1:
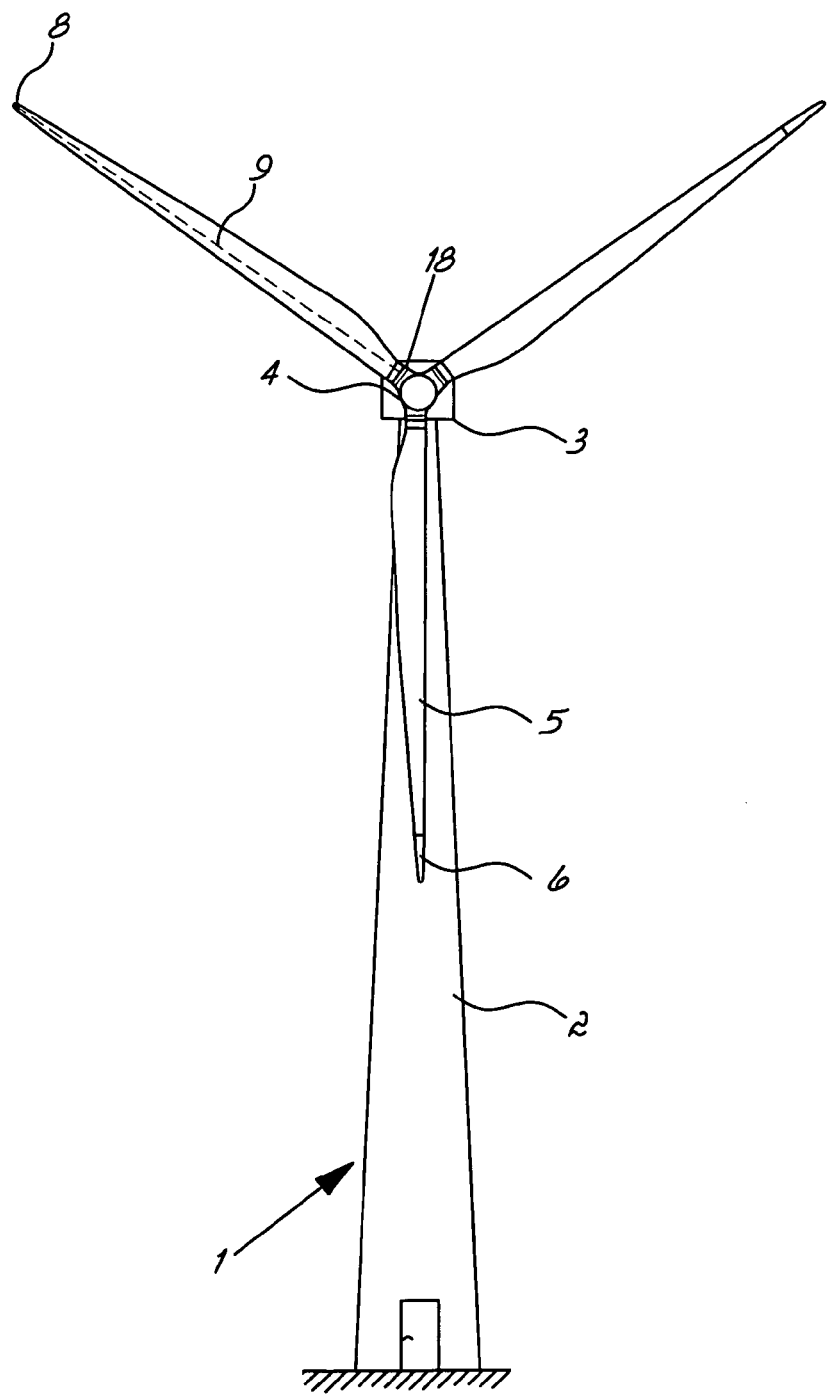
FIG. 1 illustrates an embodiment of a wind turbine with wind turbine blades and a lightning grounding system.

The drawings and the description of the drawings are embodiments of the invention and not the invention itself.

DETAILED DESCRIPTION OF EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In embodiments of a lightning conductor system for a wind turbine, the gap between the rotor blade and the nacelle, as both parts are rotatable relative to each other, is bridged by a lightning current transfer arrangement that transfers the lightning current directly from the root of the rotor blade to the nacelle. Moreover, static charges arising due to friction of the air with the rotor blades are discharged, as the lightning current transfer arrangement provides ground contact.

A conventional sliding contact arrangement, as known from WO 2005/050008 A1 mentioned at the outset, includes a metallic contact rod acting as a contact slider encircled by a slide piece made of electrically non-conducting low-friction plastics material.

It has been observed in the context of the present invention that in conventional sliding contact arrangements the galvanic connection between the contact slider and the slideway may be interrupted for short time intervals. This might be due to the contact slider lifting off the slideway, thereby momentarily disconnecting and connecting again the current path. Due to the inductance inherent in the total current path from the rotor blade tip to ground, and due to accumulation of electric charges in the rotor blades, such interruption of the current flow can induce a relatively high voltage which, in turn, may give rise to sparking flashovers at the sliding contacts. Therefore, sudden changes in the current flow between the rotor blade tip and ground may arise, producing unwanted electromagnetic radiation with a high bandwidth, radiated by the wind-turbine blades acting as a big antenna. Moreover, wind turbines located near a strong radio transmitter may receive and re-transmit a considerable amount of radio power from the radio transmitter. Here, the wind turbine can act as a sort of transponder which receives electromagnetic energy in a narrow radio frequency band. This may even increase the frequency and intensity of sparking flashovers at the sliding contacts, resulting in a retransmission of a significant part of received radio power in a broad frequency band.

It has further been observed that sparking flashovers result in increased wear of the slider due to spark erosion.

In a conventional sliding contact arrangement, sparking flashovers may often arise as the slide piece reduces the force at which the electrically conducting part of the contact arrangement, i.e. the inner-end side of the electrode is in galvanic contact with the complementary contact area.

The embodiments described herein relate to a lightning current transfer arrangement that is arranged to provide electrical contact between first and second parts of a wind turbine being rotatable relative to each other, for example, a rotor blade and the nacelle.

In the embodiments, a slide piece made is made of an electrically conducting plastics material. It has been recognized by the inventors that the slide piece provides consistent mechanical contact to the slideway, and therefore the slide piece is in consistent electrical contact as well. As reliability of electric contact is improved when the slider is moving over the slideway, electromagnetic radiation of the wind turbine due to sparking flashovers may be reduced.

The embodiments described herein comprise an electrically conductive slideway and a current transfer unit with a slider elastically biased towards the slideway. The slider comprises a metal electrode, which is oriented towards the slideway, and a slide piece made of conductive plastics, where the electrode and the slide piece are rigidly coupled to form one unit in which the slide piece is contacting the slideway.

The inner-end surface of the electrode and the sliding face of the slide piece jointly establish a contact area where the rear end of the electrode provides electric contact to the contact surface of the complementary contact area and the slide piece ensures low-friction slide on the slideway. Furthermore, the slide piece stabilizes the sliding of the electrode over the complementary contact surface ensuring that the electrode is substantially perpendicular to the complementary contact surface. The sliding surface of the slide piece will normally be significantly larger than the sliding end surface of the electrode.

With the embodiments described here, wear of the slide piece may be reduced because of two effects. Firstly, spark erosion may be reduced due to the improved electrical contact of the slider. Secondly, the mechanical bias necessary to provide reliable electrical contact of the slider to the slideway can be lowered compared to conventional sliders, resulting in reduced wear of the slider.

The term "conductive plastics" may include electrically resistive materials or semiconducting materials. Electrically conducting plastic materials exhibit a conductivity of more than $10^{-7}$ S/m. Typically, conductivity of these conductive plastics materials is in a range from about $10^{-6}$ S/m to about $10^5$ S/m.

In some embodiments, the conductive plastics material has a matrix that is isolating. However, the material includes additives that provide electrical conductivity. Plastics materials especially suitable as raw materials in terms of electric and mechanic properties and durability are, for example, polyamide (Nylon®), polyoxymethylenes (POMs), Vesconite®, ultra high molecular weight polyethylene (UHM-WPE). In some embodiments, the material includes electrically conductive additives, such as carbon black, graphite, metal flakes, metal fibers, particles or fibers coated with metal, conductively coated minerals, conductively coated ceramics, and pulverised anthracite.

In some embodiments, the material of the slide piece has a matrix of a conductive plastics material. In this case, conductivity is achieved in the material itself. However, in some embodiments, conductivity of a material with a conductive matrix is enhanced by means of additives, as mentioned above. Conductive plastics materials include polyacetylene (PAC), polyanilin (PANI), polyparaphenylene (PPP), polypyrrole (PPy) and polythiophene (PT).

During lightning strikes high electric current strengths may occur that can damage the slide piece. Therefore, in some embodiments, the electrode is arranged to also contact the slideway. In these embodiments, electrical contact is provided by the slide piece and the electrode as well. Therefore, during lightning strikes, the major part of the lightning current will flow directly from the electrode to the slideway to ground, bypassing the slide piece. In this way, the lightning current transfer arrangement is therefore arranged to withstand the high current and thermal stress that typically occurs during a lightning strike.

In some embodiments of the slider, the electrode and the slide piece have sliding surfaces, and the sliding surfaces of the slide piece and of the electrode are co-planar to provide electrical contact of the electrode in case of lightning strikes. However, when no lightning strike occurs, the slide piece may carry a significant part of electrostatic discharge current. Therefore, should there be short interruptions of the electric connection between the metallic electrode and the slideway, discharge current can still flow through the slide piece.

Due to different sliding friction coefficients of the sliding piece material and the electrode material with respect to the slideway, different mechanical forces will act upon the electrode and the slide piece part of the slider, respectively. Some parts of the interface between both materials may therefore be under tensile stress. To increase mechanical stability of the slider, in some embodiments, the electrode's sliding surface is circumscribed by the slide piece's sliding surface. In this way, a robust construction of the combination of the electrode and the sliding piece is achieved.

In some embodiments, only the slide piece is in mechanical contact with the slideway. In combination with the material of the slideway surface, the wear-pad material provides a low sliding friction coefficient and therefore low wear. In these embodiments, the electrode is arranged to move over the slideway at a distance. As the slide piece is made of conductive plastics, a permanent current path for the discharge of electrostatic charges is provided, even when the spark gap is not lit. However, to protect the slider from damage by lightning currents, the electrode is arranged to move over the slideway at a distance, thereby forming a spark gap to the slideway. In some embodiments, the slide piece and the electrode are electrically connected in parallel. Therefore, the slide piece contacting the slideway provides a first current path to the slideway, and the electrode provides a second current path to the slideway upon occurrence of a spark bridging the spark gap, where the first and second current paths are parallel current paths.

When the spark gap is not lit, electrostatic charges are discharged over the first current path, and the entire discharge current flows over the electrically conducting slide piece. It may therefore be sufficient to arrange the slide piece to carry the current arising from electrostatic discharges. However, in case of a lightning strike, the electric voltage drop of the slide piece and the sliding connection of the slide piece with the slideway will be sufficient to fire the spark gap. As the resistance of the electric arc of the spark gap is much lower than the resistance of the sliding piece contacting the slideway, the major part of the lightning current will flow over the electric arc of the spark gap. Therefore, the slide piece is protected from damage due to lightning strikes currents.

To provide a spark gap to the electrical conducting slideway, in some embodiments, the electrode is recessed from the sliding surface of the slide piece by a recess distance. Therefore, as the slide piece follows the slideway, the distance between the spark-gap electrode and the slideway is kept constant at about the recess distance. In these embodiments, the slide piece has two functions: firstly to provide reliable electric contact to the electrically conducting slideway, secondly to act as a spacer for the spark gap. The spark gap electrode moves in unison with the slide piece, controlling the width of the spark gap. If the side piece moves up or down due to radial or axial unevenness of the slideway, the spark gap electrode also moves up or down to the same extend. By this way, a constant width of the spark gap electrode is provided, therefore, the firing voltage of the spark gap can be controlled. The firing voltage corresponds to the maximum voltage drop through the slide piece occurring when the wind turbine is struck by lightning. As the maximum voltage drop can be controlled by the spark gap width, the maximum current that flows through the slide piece before the spark gap is lit can be controlled.

Protection of the slide piece by limiting the maximum current through the first path can be further enhanced when the first current path that includes the slide piece exhibits a further resistor. To this end, in some embodiments, the slide piece's resistance in the first current path is from about 10 kΩ to about 10 MΩ. In these embodiments, the plastics material of the slide piece not only acts as a contact slider and a spacer for the spark gap, but also as a resistor for protection of the slide piece, further limiting the current strength in the slide piece, for example during lightning strikes.

However, as a further function, the lightning grounding system of the wind turbine is made high-ohmic, reducing the inclination of the wind turbine to act as an antenna that radiates unwanted electromagnetic waves. For example, the resistance in the permanent discharge path further helps to reduce the magnitudes of sudden current changes that arise due to short interruptions of the electric connection or due to reception of radio power originating of nearby radio transmitters.

So far, the focus has been on the functionality of contact sliders. In some embodiments the lightning current transfer arrangement not only has one slider and one associated slideway, but two sliders with two associated slideways. This is useful, for example, if the first and second parts are rotatable relative to each other around two different rotation axes. The first slideway is electrically coupled to the second part, and the second slideway is electrically coupled to the first part. The second slider provides electrical contact to the second slideway, where its slide piece contacts the slideway and an electrode towards the slideway. The two sliders are coupled end-to-end in series. In some embodiments both sliders are of the spark-gap type with a high-ohmic slide piece. However, in other embodiments only the first slider is of the spark-gap type with a high-ohmic slide piece, while the second slider has an electrode that also contacts the slideway, and thereby provides low-ohmic electric contact between the first part and the spark-gap electrode residing with the first slider.

In some embodiments, the lightning current transfer arrangement with two sliders and two slideways is arranged between the rotor blade and the nacelle of the wind turbine. Such a lightning current transfer arrangement enables charges to be discharged from the rotor blade to ground via the nacelle. The current transfer unit is mounted on the hub, and rotates with the hub. However, both sliders and a cable connection coupling them are electrically isolated from the hub, so that lightning current bypasses the hub and rotor bearings.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 shows an embodiment of a wind turbine 1 with a nacelle 3 mounted by means of an azimuth bearing on a tower 2. The wind turbine 1 has three rotor blades 5 mounted pitch-adjustably on a hub 4 by means of blade (or pitch) bearings 11 (FIG. 2a). The hub 4 is e.g. mounted on a main shaft 10 (FIG. 2a) supported by main-shaft bearings in the nacelle 3.

A grounding system protects the mechanic and electronic equipment from damage, e.g. by lightning strikes, and prevents the rotor blades 5 from accumulating static charges. The tips 8 of the wind turbine blades 5 are equipped with lightning receptors 6 electrically connected to the root of the rotor blades 5 by a down conductor 9 leading internally along the blades 5. Further lightning receptors connected to the down conductor 9 are distributed over the length of the blades 5. In some embodiments the blades 5 are partly covered with conducting meshes connected to the down conductor 9.

The rotor blade is made of electrical non-conducting material, such as glass fiber reinforced plastics. The receptors may not only be hit by lightning, but in certain conditions may also collect static charges.

Figure 2B:
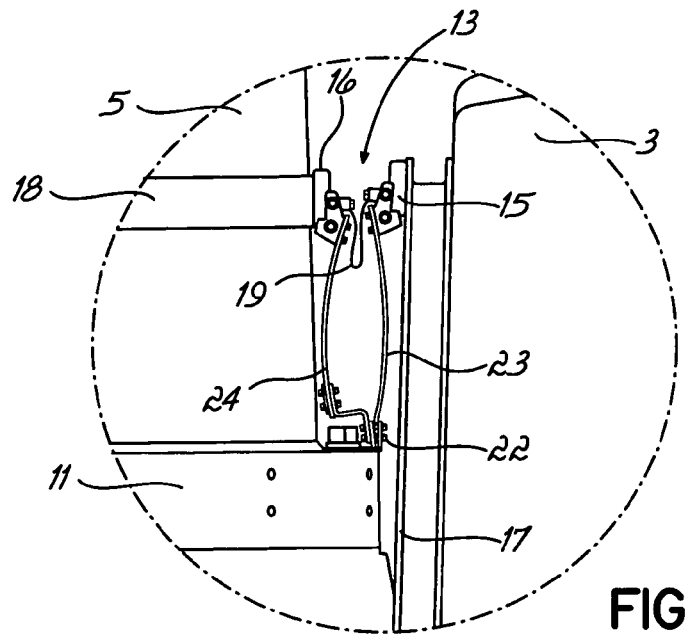
FIGS. 2a and 2b illustrate the hub portion of the wind turbine of FIG. 1, including the charge transfer region, and a first embodiment of a lightning current transfer arrangement.
Figure 2A:
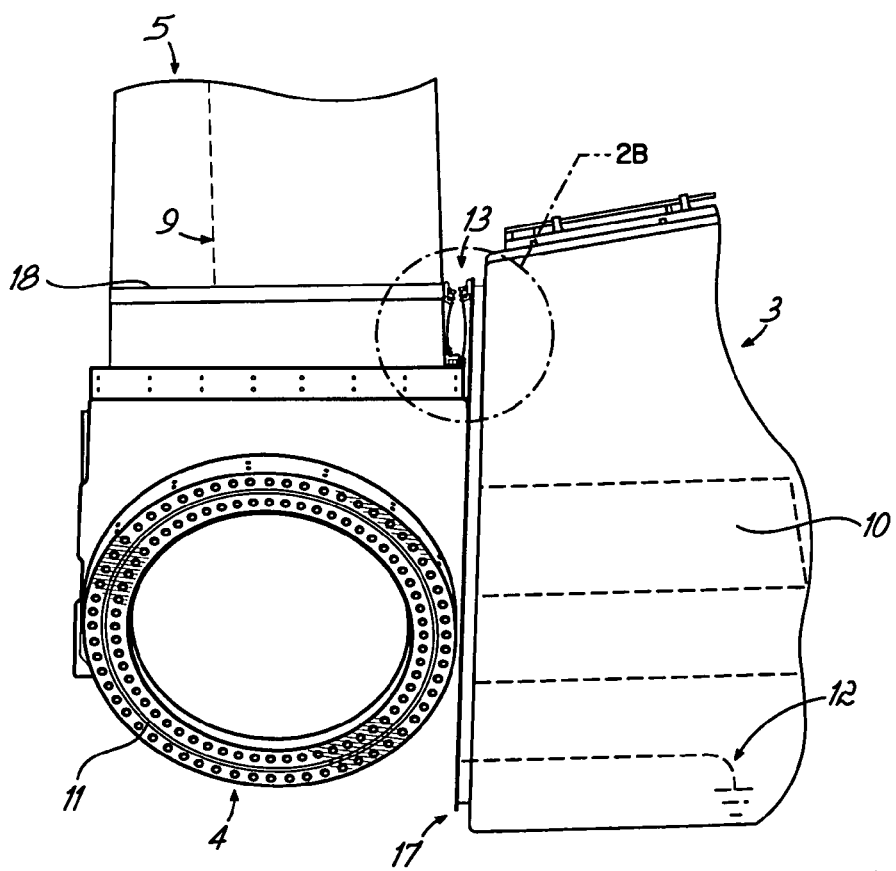

FIGS. 2a and 2b illustrate a more detailed view of the hub region including the hub 4, a blade bearing 11, a root part of a rotor blade 5 and the adjacent part of the nacelle 3 of the wind turbine of FIG. 1, with a first embodiment of a lightning current transfer arrangement. The hub 4 is fixed on the main shaft 10 and rotates with it. The main shaft 10 rotates around a (nearly) horizontal axis, while the rotor blades 5 are rotatable around (non-stationary) longitudinal axes which are perpendicular to the main-shaft axis. Thus, seen in the perspective of an observer on the rotor, a rotor blade 5 and the nacelle 3 rotate around two different (perpendicular) axes. A current transfer unit 13 is mounted on the hub 4 between the root of each blade 5 and the nacelle 3. It enables charges to be transferred directly from the blade 5 to the nacelle 3, thereby bypassing the hub 4. Each rotor blade 5 has a conductive slideway 18 arranged around its root and internally connected to the down conductor 9. In embodiments where the blades 5 are made of non-conducting material, there is no direct electrical path designed between the blade slideway 18 and the hub 4. The side of the nacelle 3 facing the hub 4 is equipped with a conductive slideway 17 around the main-shaft opening of the nacelle 3, which is electrically coupled to a down conductor on the exterior of the nacelle 3 and the tower 2 to ground 12. What is called a "lightning current transfer arrangement" is formed by a current transfer unit 13, its associated blade slideway 18 and the nacelle slideway 17. As a current transfer unit 13 is provided for each rotor blade 5, the nacelle slideway 17 is shared between three lightning current transfer arrangements, and in particular, the three transfer units 13.

Figure 3:
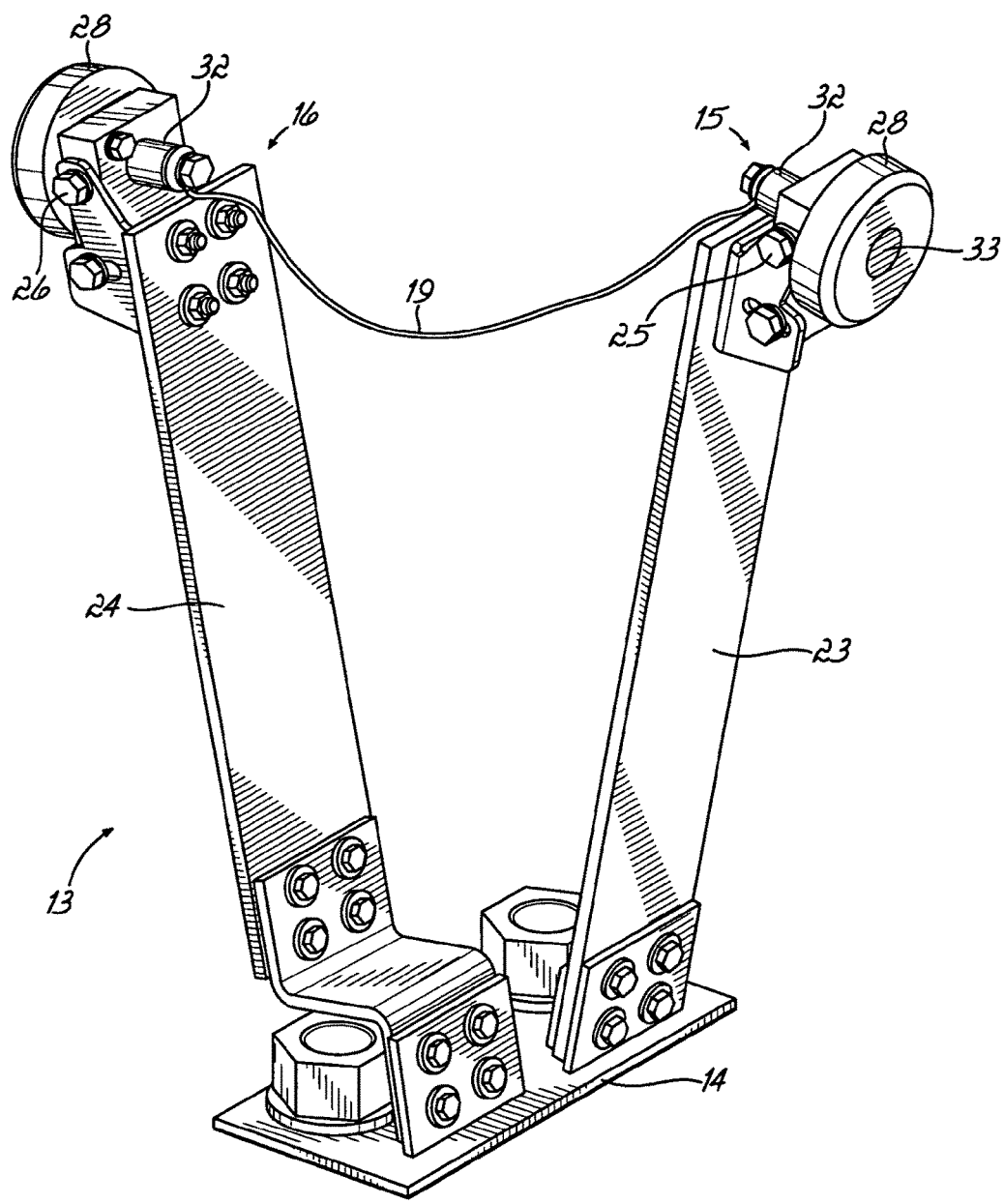
FIG. 3 illustrates a first embodiment of a current transfer unit of the lightning current transfer arrangement according to FIGS. 2a and 2b.

The current transfer unit 13 of FIG. 3 has a base support 14 fixedly mounted to the rotor hub 4 by means of mounting bolts. Thus, the current transfer unit 13 rotates with the main shaft. The slider 15 is mounted to one end of an elastically deformable strip 23 of electrically insulating material which is—at the other end—mounted to a mounting flange of the base support 14. This mounting flange projects towards the nacelle 3, so that the deformable strip 23 is bent to elastically bias the slider 15 towards the nacelle slideway 17.

In this embodiment, slider 15 is mounted in a mounting bracket with bolts in adjusting slots. Therefore, it can be pivoted around swivel axis 25 into a position to apply flat to the nacelle slideway 17.

The slider 15 (see FIGS. 4*a* and 4*b*) includes a slide piece 28 of electrically conductive plastics. The material of the slide piece 28 has a matrix of isolating plastics. The material further includes a carbon black additive to make it electrically conducting.

Slider 15 includes a metal electrode 32 that can, upon assembly, be rigidly coupled with slide piece 28. In this embodiment, electrode 32 is made of brass, and arranged to provide electrical contact to slide piece 28 as well as slideway 17. In this embodiment, slide piece 28 has a sliding surface 30, and electrode 32 has a sliding surface 33, wherein both sliding surfaces are co-planar. Moreover, the sliding surface 33 of the electrode is circumscribed by the slide piece's sliding surface 30.

The blade slideway 18 is a part of the lightning current transfer arrangement of FIG. 2*b*, and the current transfer unit 13 has a second slider 16 contacting the blade slideway 18. In this embodiment, the second slider 16 is the same as described in relation with the slider of FIGS. 4*a* and 4*b*.

The slider 16 is mounted to the base support 14 in a manner corresponding to that of slider 15: The slider 16 is pivotable around a swivel axis 26. It is mounted on an elastically deformed strip 24 made of insulating material, the strip being mounted on an outwardly projecting flange of the base support 14. The slider 16 is thereby elastically biased towards the blade slideway 18.

The electrodes 32 of the two sliders 15, 16 are electrically coupled by a cable 19, thereby providing a current path from the blade 5 to the nacelle 3 and bypassing the hub 4.

Figure 4A:
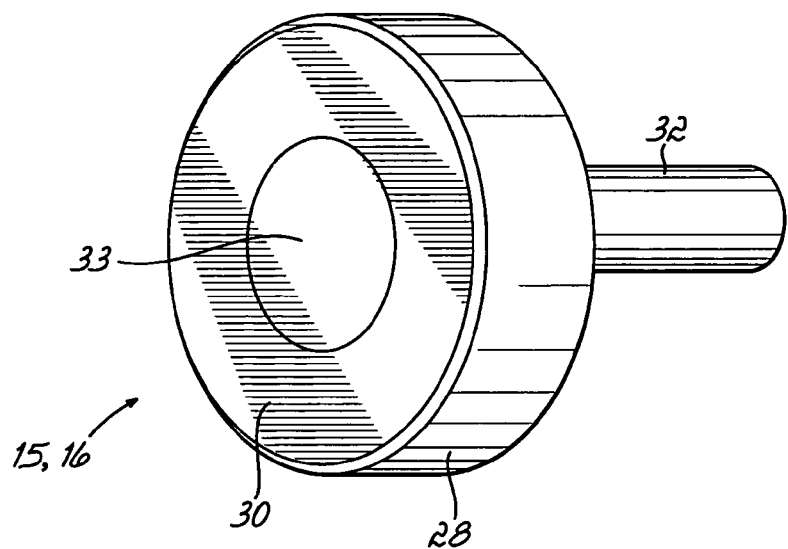
FIGS. 4a and 4b are perspective front and rear views of an embodiment of a slider with an electrode and a slide piece, used in FIG. 3.
Figure 4B:
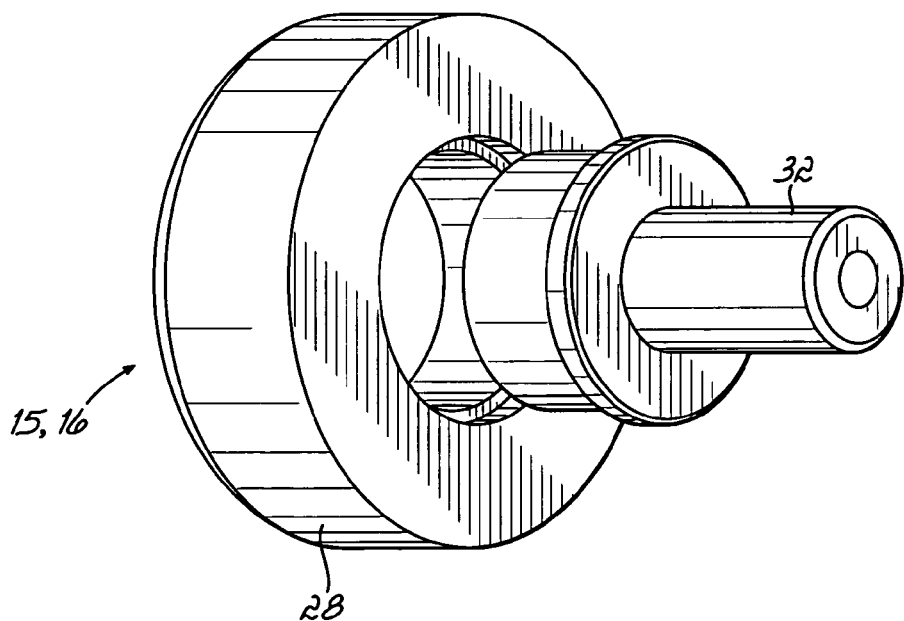
Figure 5:
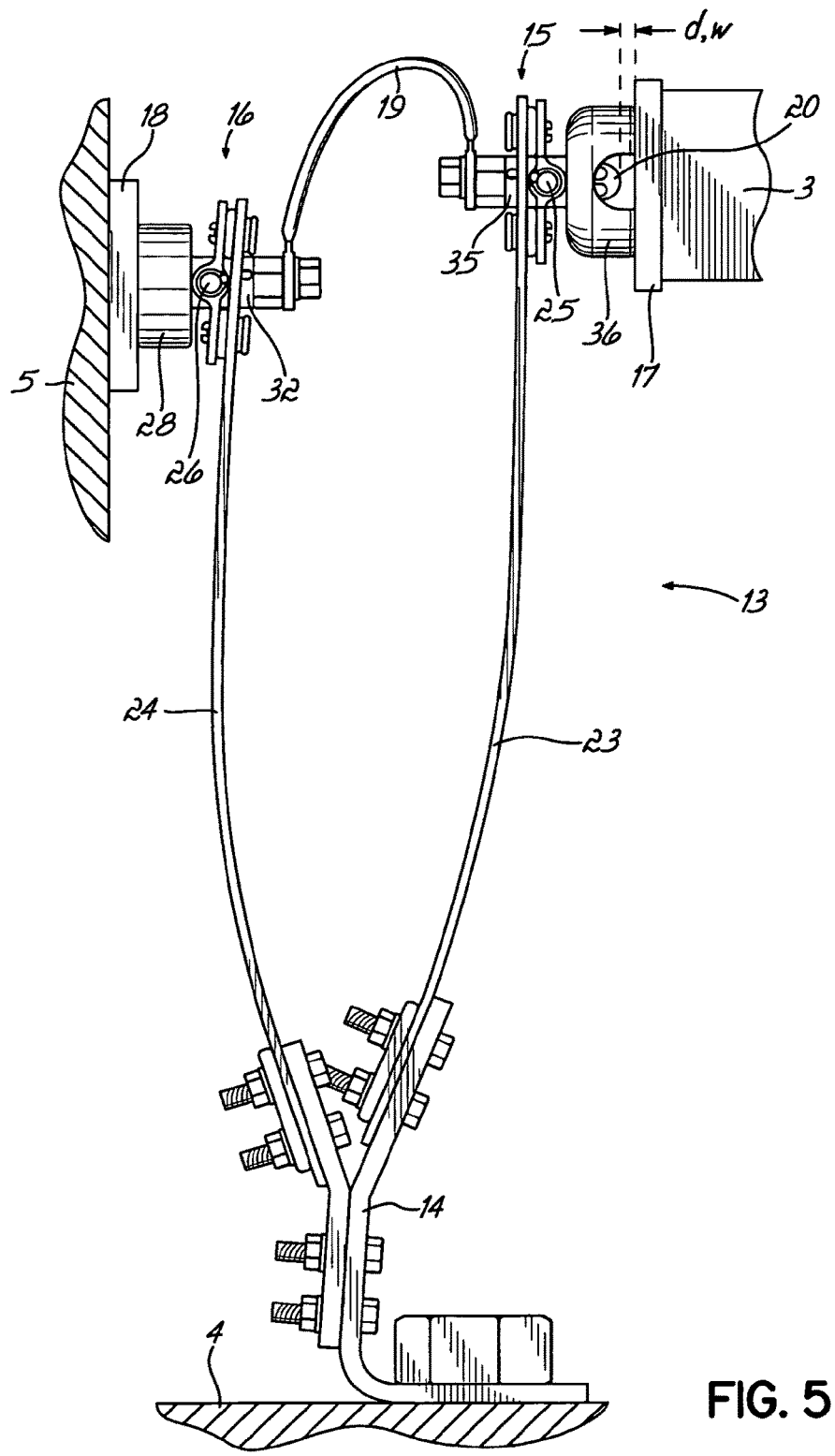
FIG. 5 illustrates another embodiment of a lightning current transfer arrangement.

FIG. 5 illustrates another embodiment of the lightning current transfer arrangement with sliders 15, 16 contacting slideways 17, 18 of the nacelle 3 and the rotor blade 5, respectively. In this embodiment, slider 16, which is in contact with slideway 18 at the rotor blade side, is of the same kind as described in relation with the slider of FIGS. 4*a* and 4*b*.

Moreover, similar to the current transfer unit of FIG. 3, the current transfer unit 13 has a base support 14 fixedly mounted to the rotor hub 4. The slider 15 is mounted to one end of an elastically deformable strip 23 which is bent such that it elastically biases the slider 15 towards the nacelle slideway 17. In the same way, slider 16 is mounted to one end of an elastically deformable strip 24 which is bent such that it elastically biases the slider 16 towards the rotor blade slideway 18. The electrodes 35, 32 of the two sliders 15, 16 are electrically coupled by a cable 19, thereby providing a current path from the blade 5 to the nacelle 3 and bypassing the hub 4.

The embodiment of FIG. 5 proposes a different coupling of the sliders 15, 16 to the strips 23, 24, respectively. Instead of using mounting brackets, sliders 15, 16 are mounted using an intermediate support 27 (FIGS. 6*a*, 6*b*) which is, in turn, coupled to the deformable strip 23, 24 by means of snap-in coupling, which facilitates ease of removal.

Figure 6A:
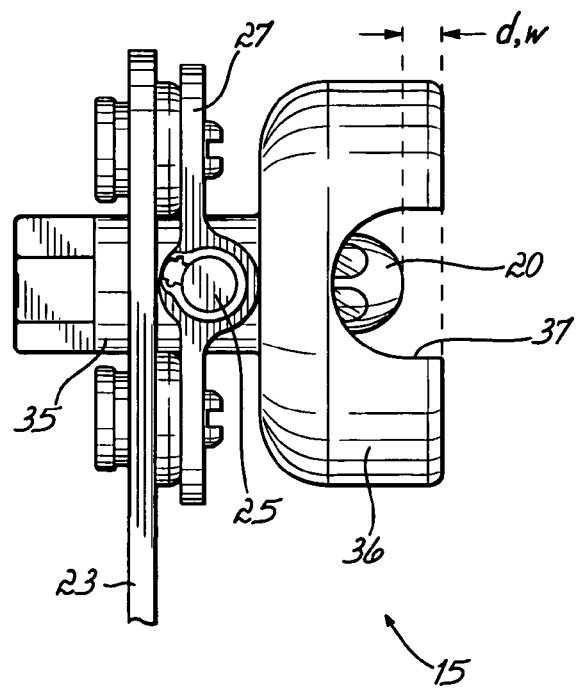
FIGS. 6a and 6b provide a side view and a perspective view of an embodiment of a slider mounted on a flat strip, with an electrode formed as a spark gap, and a slide piece, used in FIG. 5.
Figure 6B:
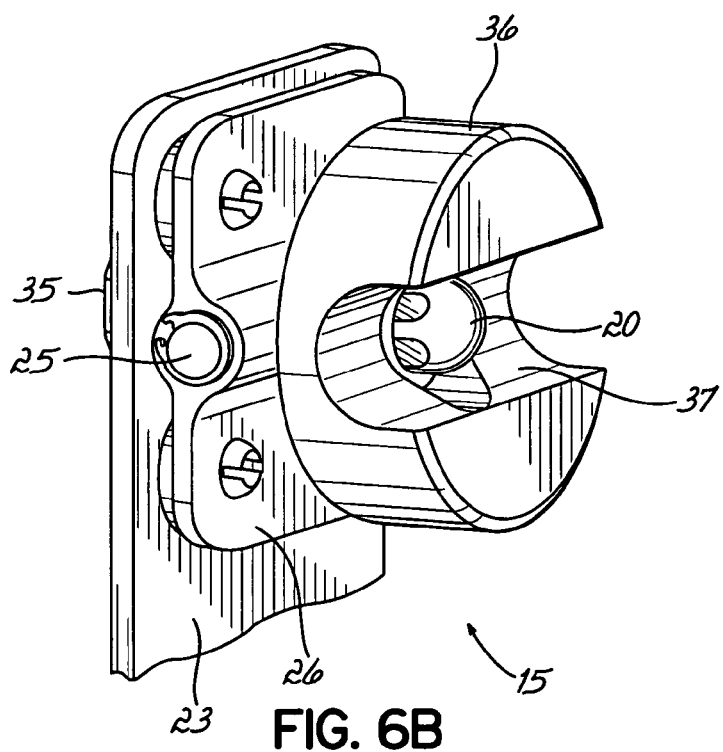

Slider 15, in contact with nacelle slideway 17, differs from the slider illustrated in FIGS. 4*a* and 4*b*, as will be explained in connection with FIGS. 6*a* and 6*b*. In this embodiment, electrically conductive sliding piece 36 is the only part contacting slideway 17. The slide piece 36 is made of electrically conductive plastics. The material of the slide piece 36 has a matrix of isolating plastics, and including a carbon black additive to make it electrically conducting. Moreover, in this embodiment, the electrical resistance of slide piece 36 measured between electrode 35 and slideway 17 is designed to be about 100 kΩ.

The electrode 35 is made of brass. However, the tip 20 of electrode 35 is made of tungsten. As can be seen from FIG. 5, electrode 35 of slider 15 is arranged to move over slideway 17 at a distance, without contacting it, thereby tungsten tip 20 of electrode 35 and slideway 17 forms a spark gap. Electrode 35 is recessed in the slider 15 by a recess distance d. As electrode 35 and slide piece 36 are rigidly coupled, electrode tip 20 moves in unison with the slide piece 15 over the nacelle slideway 17, at distance w from the slideway surface (called the "spark-gap width") controlled by the slide piece 36. The spark-gap width w corresponds to the recess distance d. In this embodiment, slide piece 36 and the electrode 35 provide parallel electrical paths. The slide piece 36 contacting the slideway 17 provides a first current path to the slideway, and the electrode 35 provides a second current path to the slideway 17 upon occurrence of an electrical spark bridging the spark gap, where the first and second current paths are parallel current paths.

In this embodiment, the tip 20 of electrode 35 is located within a cavity 37 formed by the slide piece 36. The cavity has lateral relief openings which enable air to expand when abruptly heated by a spark. The relief openings are oriented in parallel to the sliding direction (which is perpendicular to the paper plane in FIG. 5). This orientation reduces the occurrence of particles of material sputtered away from the electrode tip 20 or the nacelle slideway 17, and blown outwardly in the relief openings, depositing on that surface region of the nacelle slideway 17 which are swept by slide piece 36.

Figure 7:
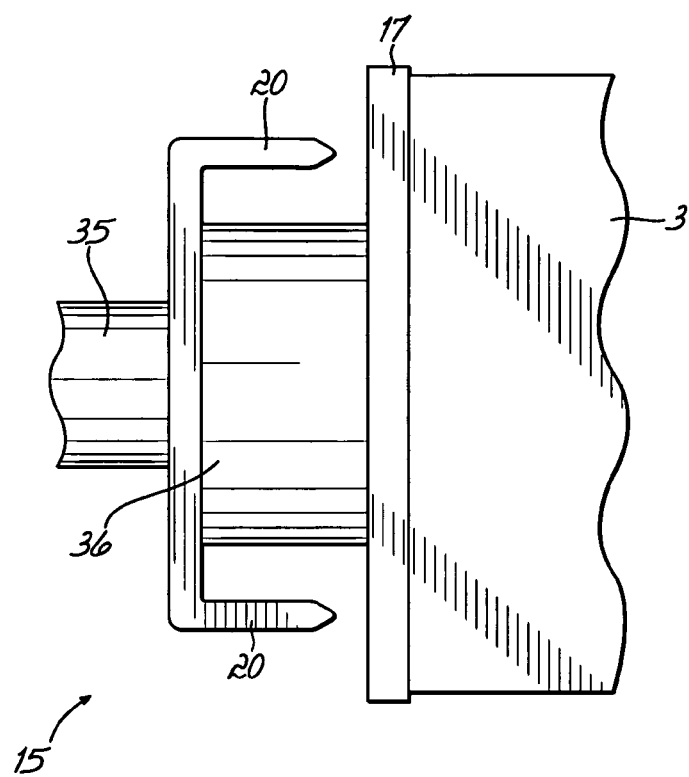
FIG. 7 is a side view of an alternative embodiment of a slider and an electrode forming two spark-gap electrodes.

FIG. 7 illustrates and alternative embodiment of a spark-gap type of slider. In the embodiment, the relative arrangement of the slider 36 and the tip 20 of electrode 35 is interchanged: the slide piece 36 is now arranged in the center of spark-gap electrode tip 20 (actually formed by two electrode tips 20).

All publications mentioned in this specification are herein incorporated by reference. While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A lightning current transfer arrangement for providing electrical contact between first and second parts of a wind turbine that are rotatable relative to each other, the lightning current transfer arrangement comprising:
   a current transfer unit electrically coupled to the first part, and
   an electrically conductive slideway electrically coupled to the second part, and rotatable relative to the current transfer unit,
   the current transfer unit comprising a slider elastically biased towards the slideway, wherein the slider comprises:
      a slide piece forming a first current path between the first and second parts through contact with the slideway, the slide piece formed of a conductive plastic material and configured to conduct electrostatic charge between the first and second parts, and
      a metal electrode rigidly coupled with the slide piece and configured to form a second current path between the first and second parts through the slideway, wherein the metal electrode forms the second current path when a voltage drop through the slide piece exceeds a predetermined maximum voltage drop.

2. The lightning current transfer arrangement according to claim 1, wherein the conductive plastic material comprises at least one conductive additive.

3. The lightning current transfer arrangement according to claim 2, wherein the at least one conductive additive is at least one of carbon black, graphite, metal flakes, metal fibers, particles or fibers coated with metal, conductively coated minerals, conductively coated ceramics, and pulverised anthracite.

4. The lightning current transfer arrangement according to claim 1, wherein the conductive plastic material comprises one of an isolating matrix and a conductive matrix.

5. The lightning current transfer arrangement according to claim 1, wherein the conducting plastic material exhibits an electric conductivity from about $10^{-6}$ siemens per meter (S/m) to about $10^5$ S/m.

6. The lightning current transfer arrangement according to claim 1, wherein the metal electrode is arranged to also contact the slideway.

7. The lightning current transfer arrangement according to claim 6, wherein the slide piece and the metal electrode each comprise a respective sliding surface, wherein the sliding surfaces of the slide piece and the metal electrode are co-planar.

8. The lightning current transfer arrangement according to claim 7, wherein the sliding surface of the metal electrode is circumscribed by the sliding surface of the slide piece.

9. The lightning current transfer arrangement according to claim 1, wherein the metal electrode is arranged to move over the slideway at a distance, thereby forming a spark gap to the slideway.

10. The lightning current transfer arrangement according to claim 9, wherein the slide piece comprises a sliding surface,
   wherein the metal electrode is recessed from the sliding surface of the slide piece by a recess distance, and
   wherein the slide piece follows the slideway during movement thereby maintaining the distance between the metal electrode and the slideway at about the recess distance.

11. The lightning current transfer arrangement according to claim 9, wherein the slide piece and the metal electrode are electrically connected in parallel,
   wherein the second current path is formed in parallel to the first current path upon occurrence of a spark bridging the spark gap.

12. The lightning current transfer arrangement according to claim 11, wherein the slide piece provides an electric resistance in the first current path from about 10 kiloohms (k$\Omega$) to about 10 megaohms (M$\Omega$).

13. The lightning current transfer arrangement according to claim 1, further comprising:
   a second slideway electrically coupled to the first part,
   the current transfer unit further comprising a second slider providing electrical contact to the second slideway, the second slider comprising a slide piece contacting the second slideway and an electrode oriented towards the second slideway.

14. The lightning current transfer arrangement according to claim 13, wherein the wind turbine comprises at least one rotor blade and a nacelle, and wherein the lightning current transfer arrangement is arranged between the rotor blade and the nacelle, and enables charges to be discharged from the rotor blade to ground via the nacelle.

15. A wind turbine, comprising:
   a first part and a second part being rotatable relative to each other; and
   at least one lightning current transfer arrangement arranged to provide electrical contact between the first and second parts, wherein the lightning current transfer arrangement comprises:
      a current transfer unit electrically coupled to the first part, and
      an electrically conductive slideway electrically coupled to the second part, and rotatable relative to the current transfer unit,
      the current transfer unit comprising a slider elastically biased towards the slideway, wherein the slider comprises:
         a slide piece forming a first current path between the first and second parts through contact with the slideway, the slide piece formed of a conductive plastic material and configured to conduct electrostatic charge between the first and second parts, and
         a metal electrode rigidly coupled with the slide piece and configured to form a second current path between the first and second parts through the slideway, wherein the metal electrode forms the second current path when a voltage drop through the slide piece exceeds a predetermined maximum voltage drop.

16. The wind turbine of claim 15, wherein the slide piece comprises a sliding surface and contacts the slideway at the sliding surface,
wherein the metal electrode is recessed from the sliding surface of the slide piece by a recess distance, and
wherein the predetermined maximum voltage drop is based on the recess distance.

17. A lightning current transfer arrangement for providing electrical contact between first and second parts of a wind turbine that are rotatable relative to each other, the lightning current transfer arrangement comprising:
a current transfer unit electrically coupled to the first part, and
an electrically conductive slideway electrically coupled to the second part, and rotatable relative to the current transfer unit,
the current transfer unit comprising a slider elastically biased towards the slideway, wherein the slider comprises:
a slide piece forming a first current path between the first and second parts through contact with the slideway and configured to conduct charge of an electrostatic discharge between the first and second parts when the electrostatic discharge results in a voltage drop through the slide piece that is less than a predetermined maximum voltage drop, and
a metal electrode rigidly coupled with the slide piece and forming a second current path through the slideway, thereby conducting the charge of the electrostatic discharge between the first and second parts, when the voltage drop exceeds the predetermined maximum voltage drop of the slide piece.

18. The lightning current transfer arrangement of claim 17, wherein the slide piece comprises a sliding surface and contacts the slideway at the sliding surface,
wherein the metal electrode is recessed from the sliding surface of the slide piece by a recess distance, and
wherein the predetermined maximum voltage drop is based on the recess distance.

19. The lightning current transfer arrangement of claim 17, wherein the slide piece is further configured to limit an amount of current flowing through the slide piece when the electrostatic discharge results in a voltage drop greater than the predetermined maximum voltage drop.

20. The lightning current transfer arrangement of claim 19, wherein the electrostatic discharge comprises a lightning strike on one of the first part and the second part.

* * * * *